United States Patent
McCafferty et al.

(10) Patent No.: US 10,423,924 B2
(45) Date of Patent: Sep. 24, 2019

(54) DETECTION OF MISPLACED OBJECTS AND ASSOCIATION WITH QUALIFIED TARGET IN VENUE FOR OBJECT RETURN

(71) Applicant: SYMBOL TECHNOLOGIES, LLC, Lincolnshire, IL (US)

(72) Inventors: Eric McCafferty, Manorville, NY (US); Andrew Schiano, West Islip, NY (US); Ian L. Fade, Nesconset, NY (US); Charles G. Lauria, Miller Place, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 19 days.

(21) Appl. No.: 15/815,433

(22) Filed: Nov. 16, 2017

(65) Prior Publication Data

US 2019/0147393 A1    May 16, 2019

(51) Int. Cl.
| | |
|---|---|
| *G06Q 10/08* | (2012.01) |
| *G06K 9/00* | (2006.01) |
| *G08B 13/24* | (2006.01) |
| *G06Q 30/02* | (2012.01) |

(52) U.S. Cl.
CPC ....... *G06Q 10/087* (2013.01); *G06K 9/00771* (2013.01); *G06Q 30/02* (2013.01); *G06Q 30/0208* (2013.01); *G06Q 30/0224* (2013.01); *G08B 13/246* (2013.01); *G08B 13/248* (2013.01); *G08B 13/2462* (2013.01)

(58) Field of Classification Search
CPC .... G06Q 10/087; G08B 13/2402–2488; H04L 67/18; H04L 67/22
See application file for complete search history.

(56) References Cited

U.S. PATENT DOCUMENTS

| | | | |
|---|---|---|---|
| 2006/0059049 A1* | 3/2006 | Morris | G06Q 30/02 705/26.1 |
| 2014/0188592 A1* | 7/2014 | Herberger | G06Q 30/0239 705/14.39 |
| 2016/0180404 A1* | 6/2016 | Stern | G06Q 30/0269 705/14.58 |
| 2017/0230801 A1* | 8/2017 | Amsalem | G01S 5/02 |
| 2018/0204163 A1* | 7/2018 | Bender | G06Q 10/06315 |
| 2018/0293604 A1* | 10/2018 | Li | G06Q 30/0208 |

* cited by examiner

*Primary Examiner* — Laura N Nguyen
(74) *Attorney, Agent, or Firm* — Yuri Astvatsaturov

(57) ABSTRACT

A method and apparatus for identifying a qualified target for an association with a misplaced item within a venue includes detecting, using a detection and locationing system, a communication device and/or person within the venue. The method and apparatus detect a physical item that has been misplaced within the venue, where that misplaced item at has one or more attributes. The method and apparatus perform a digital association of the misplaced item with the communication device or with the person, using a determined proximity and a profile attribute. With the digital association made, a digital notification is communicated to the associated communication device or person to retrieve and return the misplaced item along a determined path.

14 Claims, 5 Drawing Sheets

DETECTION OF MISPLACED OBJECTS AND ASSOCIATION WITH QUALIFIED TARGET IN VENUE FOR OBJECT RETURN

BACKGROUND OF THE INVENTION

People visiting a venue (e.g., a retail sales floor) sometimes express interest in an item (e.g., a product for sale) but do not complete a transaction with respect to the item. Instead of completing a transaction with respect to the item, the person may choose to abandon the item in the venue. The result is no transaction, and the item is abandoned at a location far from its desired location in the venue.

Accordingly, there is a need for detection of an abandoned item within a venue and identification of the abandoned item to a desired person, because there is an increased likelihood that an identified person will choose to return the abandoned item to its desired location or to complete a transaction with respect to the abandoned item.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
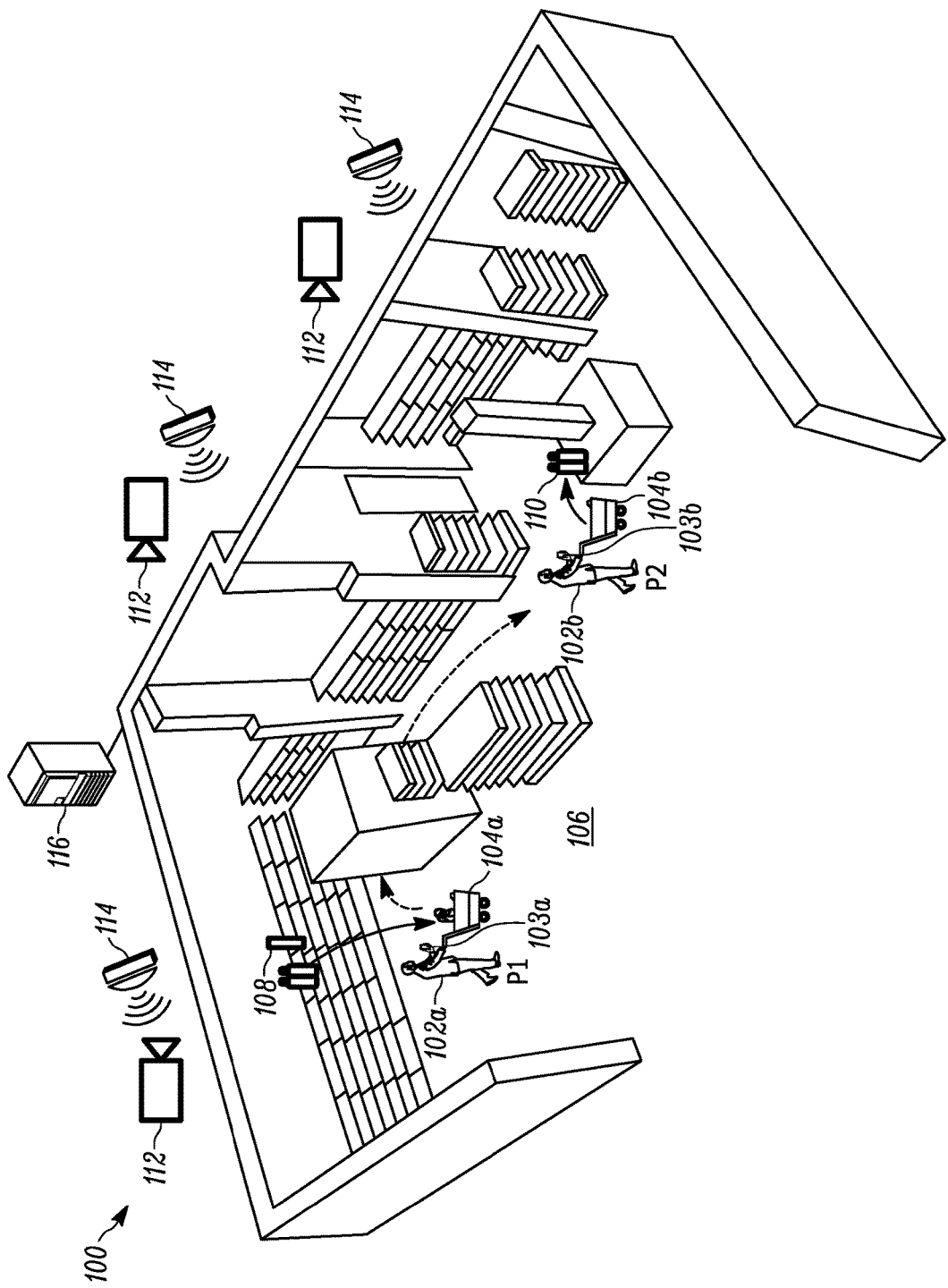
FIG. 1 is a diagram of a system for detecting an abandoned item within a venue in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In some implementations, a method of identifying a qualified target for an association with a misplaced item within a venue includes detecting, using a detection and locationing system, a communication device within the venue. The communication device may be linked with a profile associated with the venue, and that profile may include at least one profile attribute. The method may further include determining, using the detection and locationing system, a device location of the communication device within the venue, and detecting an item located outside a designated location, that item being a misplaced item. The misplaced item may have at least one item attribute, as well. The method may further include associating the misplaced item with the communication device and/or with the profile. That association may be based on (i) a sufficient proximity between the misplaced item and the communication device, and/or (ii) a sufficient correlation between the at least one item attribute and the at least one profile attribute.

FIG. 1 is a diagram of a system 100 for detecting a misplaced item within a venue 106 in accordance with some embodiments. The venue 106 may be an area, whether enclosed or not with items displayed to persons 102A, 102B, etc. (e.g., a retail sales floor, a concert venue, an exposition display space, a sporting arena, etc.). In the example illustrated in FIG. 1, the venue 106 is a store that stocks products for sale in display areas located at various places around the venue 106.

Disposed above the venue 106 is an array of sensors configured to recognize physical items in the venue and to detect when physical items have moved within the venue. In some implementations, the sensors include radio-frequency identification (RFID) antennas 114 disposed above the venue 106 and physical items displayed within the venue include RFID tags. The RFID tags may uniquely identify physical items displayed within the venue 106 or the RFID tags may generically identify physical items (e.g., according to SKU number). In some implementations, the sensors are not disposed above the venue 106, but may be disposed in other areas proximate to the venue (e.g., in the venue floor, walls, outside the venue but within transmission range, etc.).

The sensors disposed above the venue 106 may alternatively or additionally include video cameras 112. The video cameras 112 may record a video feed including at least a portion of the physical items displayed within the venue 106. The video cameras 112 or an imaging device attached thereto may recognize the physical items displayed within the venue 106 based on physical characteristics of the physical items. The video cameras 112 may detect only that a person has moved a physical item from one part of the venue 106, i.e., a desired part, to another part of the venue 106, i.e., an undesired part, resulting in a misplaced physical item. The RFID antennas 114 may complete the identification of the moved physical item. The video cameras 112 may further detect when a person, e.g., another person, has picked up the misplaced physical item and moved it from the undesired part of the venue back to the desired part of the venue.

In the venue, a physical item 108 is located in a desired location for that item, while another physical item 110, which should be located in the same desired location as item 108, has been misplaced to (or abandoned at) another location in the venue, i.e., at an undesired location. The RFID antennas 114 and/or the video cameras 112 may determine the locations of the items 108 and 110, including determining whether the item is in a desired location or whether the item has been misplaced to an undesired location. In some examples, the RFID antennas 114 and/or video cameras 112 may track items within the venue by tracking a person who picks up an item from a desired location, puts it in their shopping cart, and subsequently abandons the items at an undesired location.

In some implementations, misplacement of the physical item 110 is detected by one or more of the sensors 112 and 114 arrayed proximate to the venue 106. In some implementations, the RFID antennas 114 trilaterate the position of the physical item 110 within the venue 106 according to relative signal strength of an RFID signal received by various of the RFID antennas 114 positioned at different locations from one another with respect to the venue 106. In other implementations, the video cameras 112 recognize the physical item 110 and a location of the physical item within the venue 106 after the physical item 110 has been misplaced. Combinations of detection of the video cameras 112 and the RFID antennas 114 may also be used to detect the misplacement location of the physical item 110 (e.g., the video cameras 112 detect misplacement of an item and the RFID antennas 114 detect the identity of the item that has been misplaced).

In at least one implementation, misplacement of the physical item 110 is detected by a co-pathular movement of the persons 102A/102B and the physical item 110 followed by a divergence of the positions of the person 102A/102B and physical item 110. The divergence of the positions of the person 102A/102B and the physical item 110 may include the person 102A/102B moving while the physical item 110 remains stationary (misplaced item on a display area) or may include both the person 102A/102B and the physical item 110 moving in a non-co-pathular manner (e.g., the person 102A/102B hands the abandoned item to a staffer of the venue 106).

In the example illustrated in FIG. 1, a person 102A is within the venue 106 at a location P1. The person 102A is accompanied by a shopping cart 104A into which the person 102A may place physical items. Additionally, the person 102A has with them an associated communication device 103A. At a location P2, another person 102B is also within the venue. The person 102B also carries an associated communication device 103B and is accompanied by a shopping cart 104B. Example communication devices include mobile devices, such as smartphones, cellular phones, tablet personal computers, laptop computers, wearable computer devices such as smartwatches and head-mounted displays, as well as digital cameras, smartcards, etc. The person 102B is physically closer to the physical item 110.

In some implementations, it is desired to identify between the person 102A and the person 102B, one of them to associate with the misplaced item 110, and to target the associated person for retrieval of the misplaced item 110. For example, the video cameras 112 may identify each persons 102A and 102B and communicate that identification to a centralized server 116 that keeps stored information on persons associated with the venue. Persons associated with the venue may be previous customers who have visited the venue, customers who have previously purchased items at the venue, customers who have previously purchased items associated with the venue such as online customers, and customers who have digital accounts with the venue for purchasing. The video cameras 112 may identify the person 102A and the person 102B, and further identify their positions within the venue.

In some implementations, the RFID antennas 114 identify the persons 102A and 102B, as well as their locations, for example, when a person carries a card associated with the venue (e.g., a frequent shopper card, a credit card, a smartcard, a museum membership card, etc.) including an RFID tag that can be detected by the array of RFID antennas disposed proximate to the venue.

In some implementations, an application executing on a mobile device as the communication device 103A/103B may determine that the device is within the venue 106 based on locationing services of the device. Once the mobile device has determined that it is physically located within the venue 106, the application executing on the mobile device may communicate an identity of the person associated with the mobile device to components of the system 100.

Figure 2:
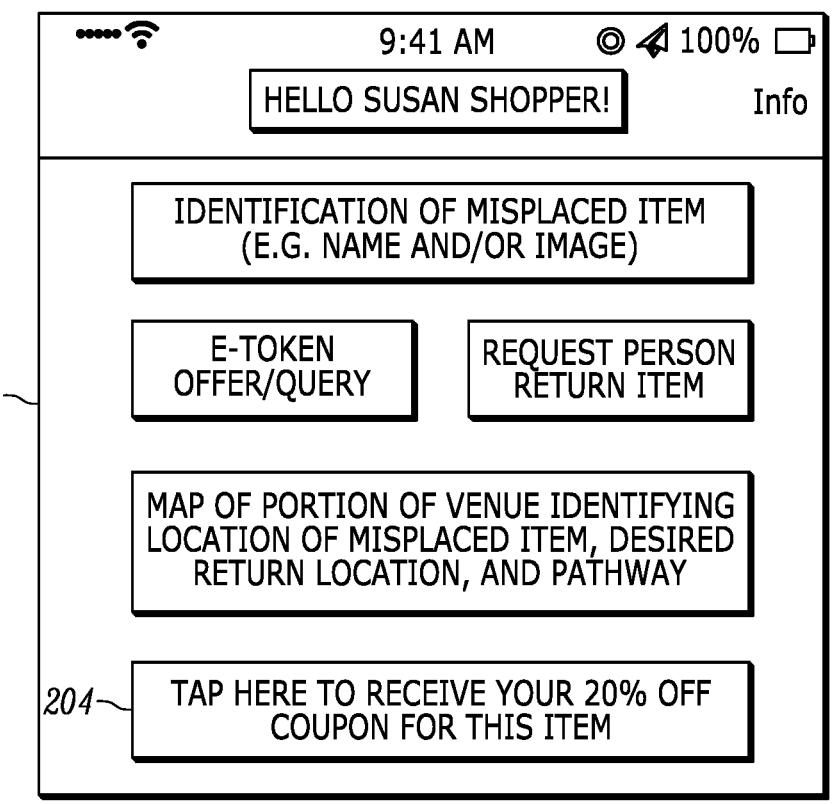
FIG. 2 is an example notification communicated to a qualified target for a misplaced item for return of the misplaced item to a desired location within a venue, in accordance with some embodiments.

FIG. 2 is an example notification 200 of an association between a person and a misplaced item and notification of an instruction to the person identifying the presence of the misplaced item within the venue and requesting that the person collect the misplaced item and return it to the desired location. The notification 200 may be displayed on a mobile device screen 202 of a communication device of the person, such as the device 103B of the person 102B.

The person to whom the notification 200 is sent may be identified in several ways. The identification is the result of an association of the person and/or a communication device with the misplaced item. In some implementations, the person is identified according to a communication device (e.g., a mobile device) associated with the person. A mobile device associated with the person may include an application executing on the mobile device associated with the venue, for example. The application executing on the mobile device may determine that the device is within the venue based on locationing services of the mobile device (e.g., recognition of, or connection to, a wireless network known to be available at the venue based on SSID, GPS services on the mobile device, interaction with the person indicating presence at the venue, etc.). Once the mobile device has determined that it is physically located within the venue, the application executing on the mobile device may communicate an identity of the person associated with the mobile device to components of the system for detecting abandoned physical items within the venue (e.g., wireless communication of the identity). That identification may be stored in the centralized server 116, for example. In some implementations, the mobile device associated with the person may determine and transmit the person's location within the venue to components of the system for detecting abandoned physical items within the venue (e.g., ultrasonic locationing, locationing based on a wireless beacon, locationing based on relative wireless signal strengths, via the camera or other sensors of the mobile device, etc.).

Another way to identify the person to whom the notification 200 should be sent is via RFID identification of the person. For example, without limitation, the person may carry a card associated with the venue (e.g., a frequent shopper card, a museum membership card, etc.) including an RFID tag that can be detected by the array of RFID antennas disposed proximate to the venue. Once the RFID tag associated with the person has been detected by the array of RFID antennas, an identity of the person may be further associated with any misplaced items. In other implementations, the array of cameras may recognize the person (e.g., via facial recognition). Combinations of these implementations may also be employed. For example, a person may be recognized upon entry to a venue based on an RFID tag detection or via a mobile device. Once it is known that a particular person is within a venue, the person may be tracked according to other method such as via video recognition. In some implementations, characteristics that are known to be associated with a person (age, gender, height, facial appearance, etc.) may be used by the array of video cameras to track the person within a venue.

In some implementations, the person to be associated with the misplaced item is determined by the proximity between the persons in the venue and the misplaced item. Sensors in the venue, such as the RFID antennas and video cameras, may determine the location of the people within the venue relative to the location of the misplaced item. The person closest in proximity to the misplaced item, which would be person 102B in the example of FIG. 1, would be associated with the misplaced item. In some implementations, sensors track the movement people in the venue and determine proximity at a future point in time, based on movement patterns or direction of movement, from which the person with the nearest future proximity is associated with the misplaced item.

In some implementations, the person to be associated with the misplaced item is determined by correlating at least one attributed of the misplaced item with at least one profile attribute. Example attributes of the misplaced item include the type of item, the price of the item, the desired location of the item, the current misplaced location of the item, and the preferred path in the venue for returning the item from the misplaced location to the desired location. Example profile attributes include demographic information on the person, such as their age, gender, marital status, occupation, etc. Other example profile attributes include venue-dependent profile attributes, such as a person's purchasing history in the venue, a person's purchasing history for items similar to or including the misplaced item, frequency of visits to the venue by the person, the time from the person's last visit to the venue, and duration of time the person has been in the venue. These attributes and other data may be stored electronically and accessed by a system.

The notification 200 may include various pieces of information displayed on the mobile device screen 202. The notification 200 may take other forms of communication to the person such as instant message, short messaging service (SMS) message, social media message, email, pop-up in an application executing on the mobile device associated with the venue, voice call, etc. In at least one implementation, the notification 200 is sent to the person while she is still within the venue, such as when the person is in proximity to the misplaced item 110. The notification 200 may include an identification of the misplaced physical item 110 and an request to return the item. The notification 200 may include an electronic token communicated to the person, offering the person an incentive to return the item. The notification 200 may include an electronic token communicated to the person, offering the person a discount to purchase the item. The token may operate as an electronic incentive offered to the associated person. The token may include an electronic gift card, electronically-issued credit to a customer's account, electronic wallet, cryptocurrency, electronic venue-specific coupon, electronic item-specific coupon, or other electronically issued consumable item. These are examples of tokens that may be used to offset a transaction expenditure. The token may include other electronically issued items that are not consumable, such as electronic images, wallpaper, ribbons, badges, avatars, etc., where, for example, some of these items may would be electronically collectable on a customer's mobile device. The electronic token may be displayed along with query on whether the customer accepts a request to return the misplaced item, at which point the electronic token may be electronically issued to the customer's mobile device immediately or after the customer has returned the misplaced item to a desired location. In some implementations, the notification 200 includes a discount to a regular sales price of the physical item (e.g., a 20% discount to the regular sales price). The notification 200 may include a button 204 to initiate a request to purchase the physical item at the discounted sales price, for example. In some implementations, the button 204 causes the display of a coupon for presentation at a checkout area for purchase of the physical item.

Figure 3:
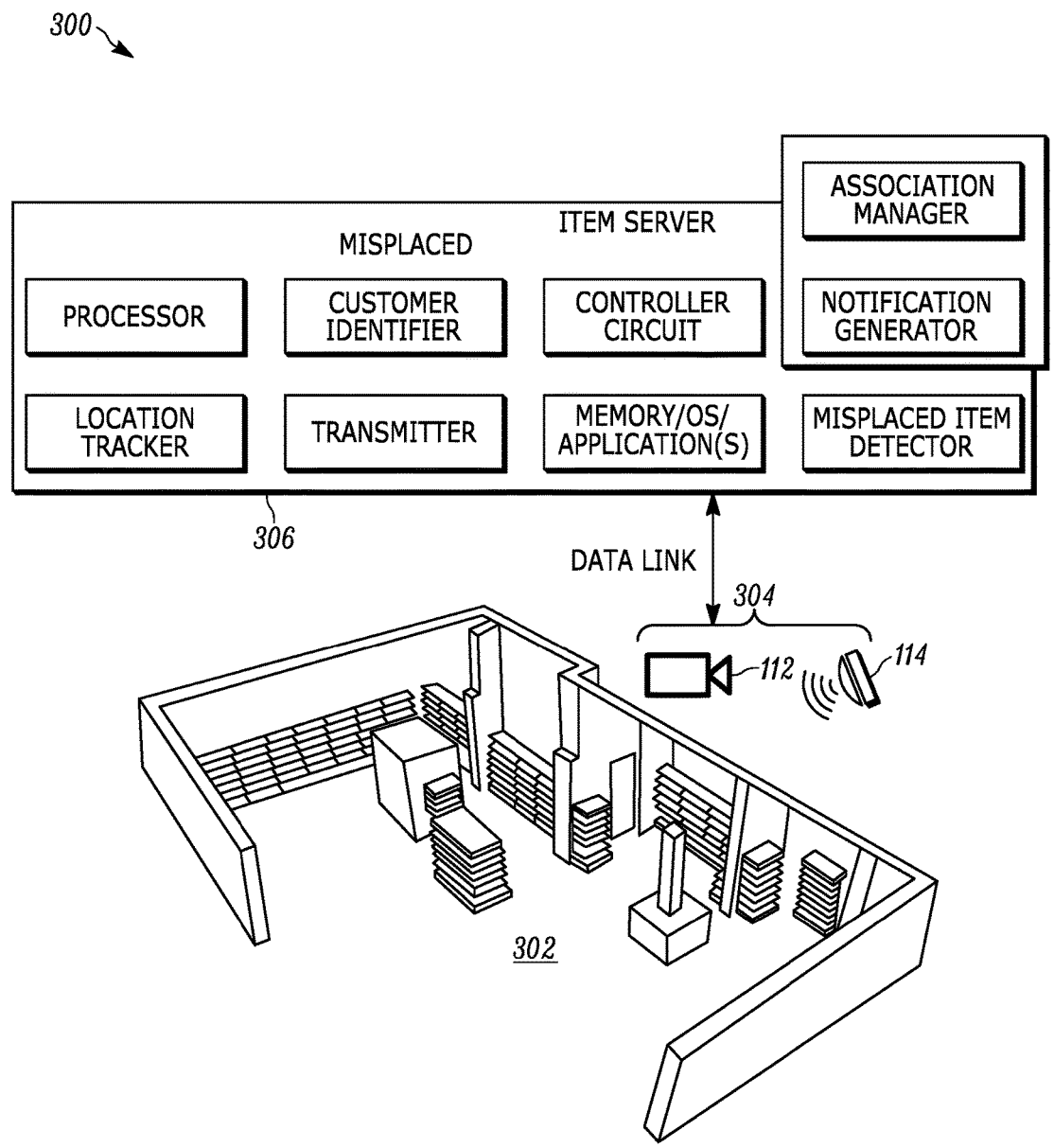
FIG. 3 is a block diagram of a system for detecting an abandoned item within a venue and identifying a qualified target for an association with the misplaced item, in accordance with some embodiments.

FIG. 3 is a block diagram of a system 300 for detecting a misplaced item within a retail venue 302 with a misplaced item server in accordance with some embodiments. The retail venue 302 may include any physical area wherein items are displayed to people within the area. Disposed proximate to the area are one or more locationing sensors 304. The locationing sensors 304 may include video cameras, RFID antennas, pressure sensors, motion sensors, or any other type of sensor for determining the presence and movement of people and physical items.

The locationing sensors 304 are communicatively coupled to a misplaced item server 306. The misplaced item server 306 includes components for detecting a physical item misplaced by a person within the retail venue 302 and communicating a notification to another person regarding the misplaced item. Components of the misplaced item server 306 include a processor and memory/OS/application(s) configured to perform any of the functions described herein. The misplaced item server 306 further includes a customer identifier for determining a customer identity of a person on the retail sales floor. The customer identifier may identify a customer on the retail venue 302 by interactions with the locationing sensors 304 (e.g., facial recognition, RFID tag recognition, etc.) or through recognition of a mobile device associated with the person (e.g., an application executing on the mobile device, etc.).

A location tracker of the misplaced item server 306 tracks the location of physical items displayed on the retail sales venue 302—and in some examples tracks the location of the person within the retail sales venue 302. The location tracker may rely on the locationing sensors 304 and/or other sensors (weight sensor, motion sensor, etc.) to track the location of physical items. In some implementations, the location tracker periodically determines a location of physical items offered for sale on the retail venue 302, such as by a polling signal to receive location information at regular intervals.

The misplaced item detector determines that a physical item is misplaced, for example, if the physical item is at a location a sufficient distance from a desired location, and maintained at that location for a threshold amount of time. In some implementations, the misplaced item detector may base a determination that an item has been misplaced by a person, if the physical item was temporarily in possession of the person on the retail sales venue, as detected by locationing sensors in the venue tracking the person and/or the item in their possession. In other implementations, the misplaced item detector may base a determination that an item has been misplaced by the person if the physical item moved from a first location on the retail venue 302 to a second location on the retail venue 302.

With a misplaced item identified by the misplaced item detector, an association manager determines a person or communication device to associate with the misplaced item. The association may be a pairing of digital information of the person or communication device with digital information for the misplaced item; and in some examples that pairing may be stored at a central server such as server 116. The association manager may receive an identification of the persons within the venue, as identified by the customer identifier. That identification may include one or more profile attributes for each of the identified customers. Additional position information for the persons within the venue is communicated from the location tracker to the association manager. The association manager assesses the received information identifying the persons, the proximity information for each person relative to the misplaced item, one or more attributes for the misplaced item, and the one or more profile attributes for the persons. The attributes for the misplaced item may be received from the misplaced item detector, for example, when the misplaced item detector detects the misplaced item, the misplaced item detector may access stored attributes for the misplaced item and communicate them to the association manager. To perform an association, the association manager may apply the received information to a decisional algorithm that determines whether to make an association with a person or a communication and which person or communication device among a plurality of them is the one to associate with the misplaced item. For example, the association manager may score each person based on profile attribute information, such as demographic information profile attributes, venue-dependent profile attributes, or other profile attributes. The association manager may identify the person with the highest score as the person to be associated with the misplaced item. Such scoring may include weighting certain factors such as a person's proximity to the misplaced item or a person's predicted likelihood that the person would purchase the misplaced item if offered an incentive token to do so.

In some examples, the association manager scores the various communication devices located within the venue. Such scoring may result from the communication devices having different profile attribute information that may be scored differently than scoring of profile attribute information for persons. Additionally, such scoring may result from determining the proximity of the communication device, which in some venues may be achieved, while identification of a person may not be achieved, for example, where a person's face is not within the venue of a video camera as the location tracker. As with profile attribute information for persons, weighting of different attributes may be performed to score amongst the different communication devices. Additionally, communication devices may be scored and associated with the misplaced item when a person cannot be identified by the customer identifier. For example, in some implementations, a person may have never visited the venue before or the person may not have an established account with the venue. In some implementations, a person may have downloaded software associated with venue 304, for example, a mobile app associated with a retailer having the venue 304, but the person may not have yet opened an account through the software, or the person may have logged out of the software.

In some implementations, the association manager determines, based on customer identification and location tracking information, the identify of a person that moves the item from the designated location and abandons the item at an undesired location. The association manager may further associate the misplaced item with a person, so long as the associated person is not the same as the abandoning person. The association manger may store an identification of abandoning persons and exclude them from scoring and therefore exclude them from association, for example. In some implementations, the association manager determines an identity of a carrier of a communication device for example using facial recognition using video cameras within the venue. If the association manager determines that the carrier has abandoned the item, then the association manager may exclude the communication device from being associated with the misplaced item, so as to prevent a person from moving an item to an undesired location and receiving through their communication device an association and notification to move the misplaced item back to its desired location.

With the person or communication device associated with the misplaced item, a notification generator communicates an indication that that an association has been made with a misplaced item. The notification generator may communicate an indication of where the misplaced item, such as by sending location data to the mobile device that location data identifying where the misplaced item is in the venue. A mobile app executing on the mobile device may then display a map indicating the location of the person and the location of the associated device. The notification generator may further communicate a desired location of the misplaced item, which the mobile device may display to the user. The notification generator may further communicate an instruction to be displayed to the person to request that the person move the misplaced physical item to the desired location. The notification generator may instruct that a map be displayed a mobile device and that the map provide a visual path in the venue extending from a current location of the misplaced item to a desired location. In some implementations, the visual path may be different for different associated persons. For example, depending one or more profile attributes for a person, the path for returning to the misplaced item may be routed along a path in the venue that takes the associated person through areas of the venue that match their profile attributes. A person with a purchase history that includes outdoors equipment may receive a visual path that routes them through an outdoor equipment area of the venue, while another person with a purchase history that includes television and camera purchases may be presented a visual path that routes them through an entertainment are of the venue.

In some implementations, the notification generator may communicate a token to incentivize the other person to move the misplaced physical item to the desired location. For example, the notification generator may communicate to a mobile device of the person a digital (i.e., electronic) token that appears on the mobile device display. The notification generator may communicate an offer to the associated person, such as an offer for purchase of the misplaced item at a price lesser than an advertised sale price. The sales offer may alternatively include an offer with free shipping for the misplaced item. The sales offer may additionally or alternatively include an offer for a substitute item that shares characteristics with the abandoned item but also includes differences (e.g., different price, higher margin, higher stock count, etc.). The notification generator may transmit the token to the person via a transmitter on the misplaced item server 306. In some implementations, the token is not transmitted to the associated person until the person has returned the misplaced item to the desired location. For example, the notification generator may communicate a notification to a person's mobile device instructing that upon return of the misplaced item, a token will be sent to the person.

Figure 4:
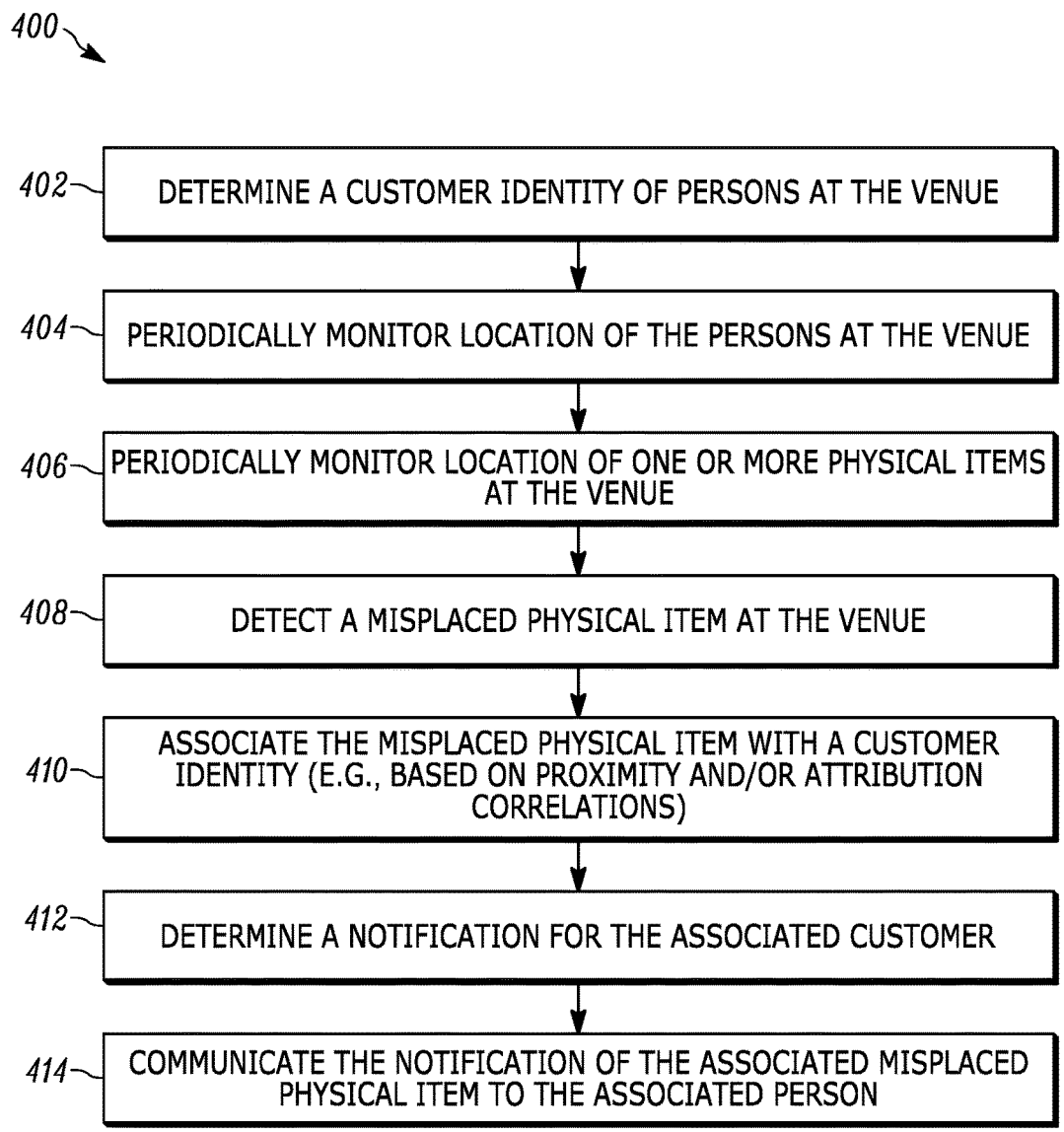
FIG. 4 is a flowchart of a method of identifying a qualified person for an association with a misplaced item within a venue having a network of transceivers, in accordance with some embodiments.

FIG. 4 is a flowchart of a method 400 of detecting misplaced merchandise within a venue having a network of transceivers and associating the misplaced item with a person, in accordance with some embodiments. The method 400 includes a determining operation 402 that determines a customer identity of one or more persons at the venue. The determining operation 402 may identify the customers according to recognition of a mobile device associated with persons, according to facial recognition technology, according to a customer self-identification, etc.

A monitoring operation 404 periodically monitors a location of each person at the venue. The monitoring operation 404 may be performed by sensors proximate to the venue such as video cameras, RFID antennas, etc. The monitoring operation 404 may poll the location of the person over a period of time, such as after the person was first detected at the venue until the person is no longer present at the venue.

A monitoring operation 406 periodically monitors a location of physical items offered for sale at the venue. The monitoring operation 406 may poll the location of the physical items (e.g., RFID tag recognition) over an interval of time.

A detecting operation 408 detects misplacement of the physical item. The detecting operation 408 may be based on a movement of physical items that is not co-pathular after a period of time during which the movement of the item is co-pathular. The detecting operation 408 may identify an item as misplaced when that item has been in an undesired location for a threshold amount of time.

In some examples, the monitoring operation 406 monitors the location of the physical item by monitoring the location of a person in possession of the physical item, coordinating with the monitoring operation 404. The detecting operation 408, therefore, may determine that a physical item has been misplaced, by detecting based on a movement of the person, when a person has abandoned the physical item in an undesired location in the venue. For example, the detecting operation 408 may identify from video captured data and locationing data when a person abandons an item by leaving it at an undesired location in the venue. In some implementations, the detection operation 408 further identifies the person who abandoned the physical item. For example, that person may be identified by the detecting operation 408 through facial recognition using video cameras in the venue. In other examples, that person may be identified by detecting a communication device of the person through the use of sensors in the venue. The identity of the person who abandons an item may then be used to ensure that the same person is not later associated with the physical item. The retailer for the venue may not want to request that the person who abandons an item also be requested to return the item to its desired location.

An associating operation 410 associates the physical item with one of the customers in the venue based on proximity between the misplaced item and the person and/or based on a correlation between at least one item attribute and at least one profile attribute.

A notification operation 412 determines a notification to communicate to the associated person. The notification may include an identification of the misplaced item (e.g., one or more item attributes), as well as a current location for the misplaced item. The notification may include a request to move the misplaced item to a desired location, along with location information to be displayed to the customer, using the customer's communication device. The notification may include a digital incentive token to be communicated to the communication device of the customer. A communicating operation 414 communicates the notification to the person by communication the notification to the communication device of the person using a wireless network. The communicating operation 414 may include transmitting the notification via a mobile device, an email, an instant message, a social message, etc. The communicating operation 414 may further be based on a period of time after the detecting operation 408.

Figure 5:
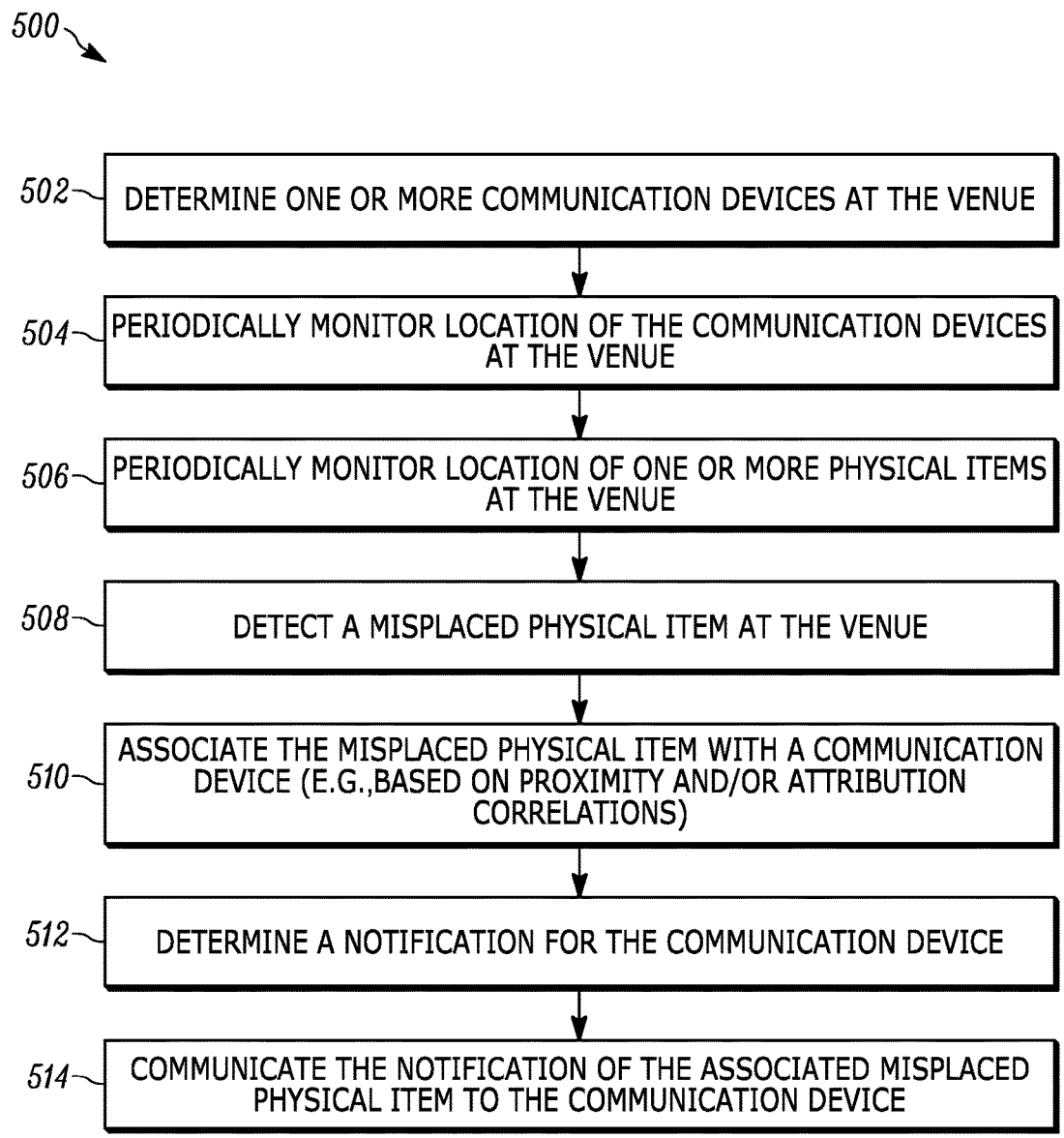
FIG. 5 is a flowchart of another method of identifying a qualified communication device for an association with a misplaced item within a venue having a network of transceivers, in accordance with some embodiments.

FIG. 5 is a flowchart of a method 500 of detecting misplaced merchandise within a venue having a network of transceivers and associating the misplaced item with a communication device, in accordance with some embodiments. The method 500 is similar to that of the method 400 and therefore like reference numerals are used.

A determining operation 502 determines that one or more communication devices are at the venue, where the communication devices are linked with a profile associated with the venue, such as a profile of a customer or person at the venue. The determining operation 502 may identify the communication devices according to data received from the communication data, as the communication device recognizes that it is within the venue. For example, when the communication device is a mobile device, an application executing on the mobile device may determine that the device is within the venue based on locationing services of the device. Once the mobile device has determined that it is physically located within the venue, the application executing on the mobile device may communicate an identity of the mobile device and/or of the persons associated with the mobile device to the misplaced item server.

A monitoring operation 504 periodically monitors a location of each communication device at the venue. The monitoring operation 404 may be performed by sensors proximate to the venue such as video cameras, RFID antennas, etc. The monitoring operation 504 may poll the location of the communication device over a period of time, such as after the communication device was first detected at the venue until the communication device is no longer present at the venue.

A monitoring operation 506 periodically monitors a location of physical items offered for sale at the venue. The monitoring operation 506 may poll the location of the physical items (e.g., RFID tag recognition) over an interval of time.

A detecting operation 508 detects misplacement of the physical item, in a similar manner to operation 408.

An associating operation 510 associates the physical item with one of the communication devices in the venue based on proximity between the misplaced item and the communication device and/or based on a correlation between at least one item attribute and at least one attribute of a profile associated with the communication, if a profile is associated with the communication device.

A notification operation 512 determines a notification to communicate to the associated communication device, in a similar manner to operation 412. The notification may be sent to the communication device for display to a person holding the communication. In some examples, the person holding the communication has a profile associated with the communication device, such as when a person has logged in to the communication device or logged into a notification application executing on the communication device. In other examples, the person holding the communication device does not have profile associated with the communication device, but rather is merely operating the communication device. The notification may include an identification of the misplaced item, an instruction to return the item, current and desired location information on the item, and/or an incentive token for returning the item. A communicating operation 514 communicates the notification to the communication device using a wireless network. As with operation 414, the communicating operation 514 may include transmitting the notification via a mobile device, an email, an instant message, a social message, etc. The communicating operation 514 may further be based on a period of time after the detecting operation 508.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of identifying a qualified target for an association with a misplaced item within a venue having a detection and locationing system, the method comprising:

detecting, via the detection and locationing system, a communication device within the venue, the communication device being linked with a profile associated with the venue, the profile including at least one profile attribute;

determining, via the detection and locationing system, a device location of the communication device within the venue;

capturing an identity of an individual that moves an item from a designated location within the venue;

detecting, within the venue, the item located outside the designated location, thereby identifying the item as the misplaced item, the misplaced item having at least one item attribute; and associating the misplaced item with at least one of the communication device and the profile based on (i) a sufficient proximity between the misplaced item and the communication device, (ii) a sufficient correlation between the at least one item attribute and the at least one profile attribute, and (iii) the identity of the individual being different from at least one of an identity of a profile owner and an identity of a carrier of the communication device.

2. The method of claim 1, wherein the at least one profile attribute is related to at least one of the venue and a profile owner.

3. The method of claim 1, further comprising: instructing the communication device to identify the misplaced item on a display of the communication device.

4. The method of claim 3, further comprising: instructing the communication device to identify the designated location on the display of the communication device.

5. The method of claim 4, further comprising:
  detecting the misplaced item being located in the designated location; and
  assigning a token to the profile.

6. The method of claim 5, wherein the token is operative to offset a transaction expenditure.

7. The method of claim 5, further comprising: instructing the communication device to provide an alert upon the assignment of the token to the profile.

8. The method of claim 4, further comprising:
  instructing the communication device to identify a visual path through the venue from the device location to the designated location.

9. The method of claim 8, wherein the visual path is based in part on a second at least one profile attribute.

10. The method of claim 1, wherein the detection and locationing system includes a plurality of transmitters disposed throughout the venue and operable to transmit locationing signals to the communication device.

11. The method of claim 10, wherein the locationing signals include at least one of ultrasonic signals and radio frequency signals.

12. The method of claim 1, wherein at least one profile attribute includes at least one of purchase history data, purchase likelihood data, and communication device location history data.

13. The method of claim 1,
  wherein the (iii) the identity of the individual being different from at least one of an identity of a profile owner and an identity of a carrier of the communication device includes (iii) the identity of the individual being different from an identity of a profile owner and an identity of a carrier of the communication device.

14. The method of claim 13, wherein the operation of capturing the identity of an individual is performed by a video tracking system operable to associate the individual with the item.

* * * * *